April 14, 1936.  G. E. BAROZZI  2,037,559
DRYING APPARATUS
Filed Feb. 25, 1935
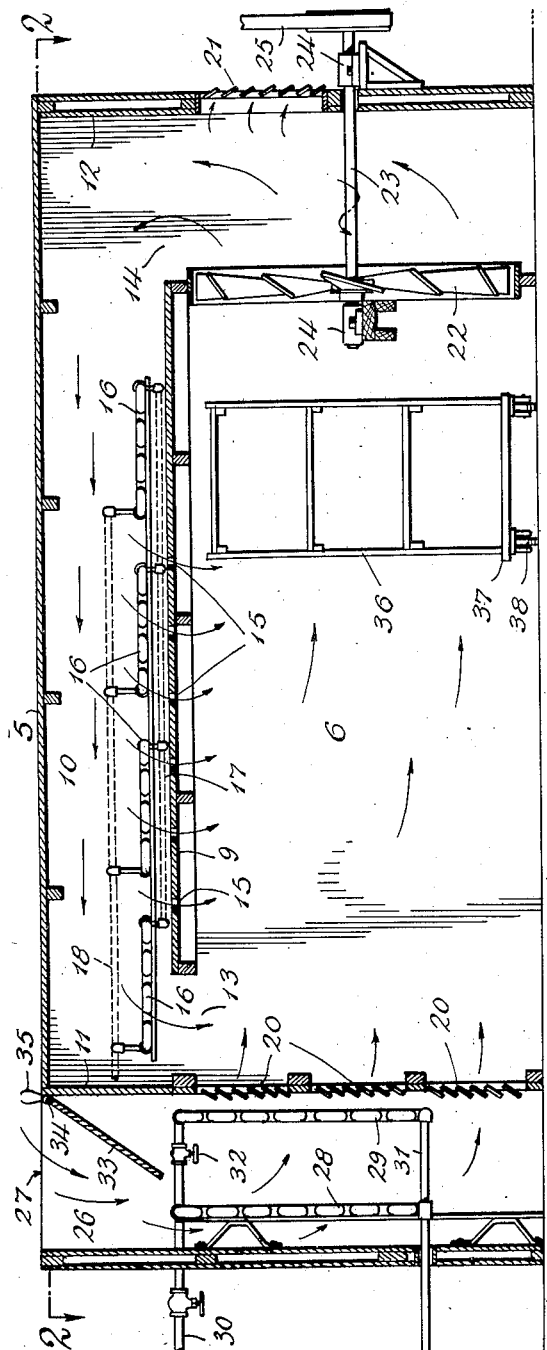
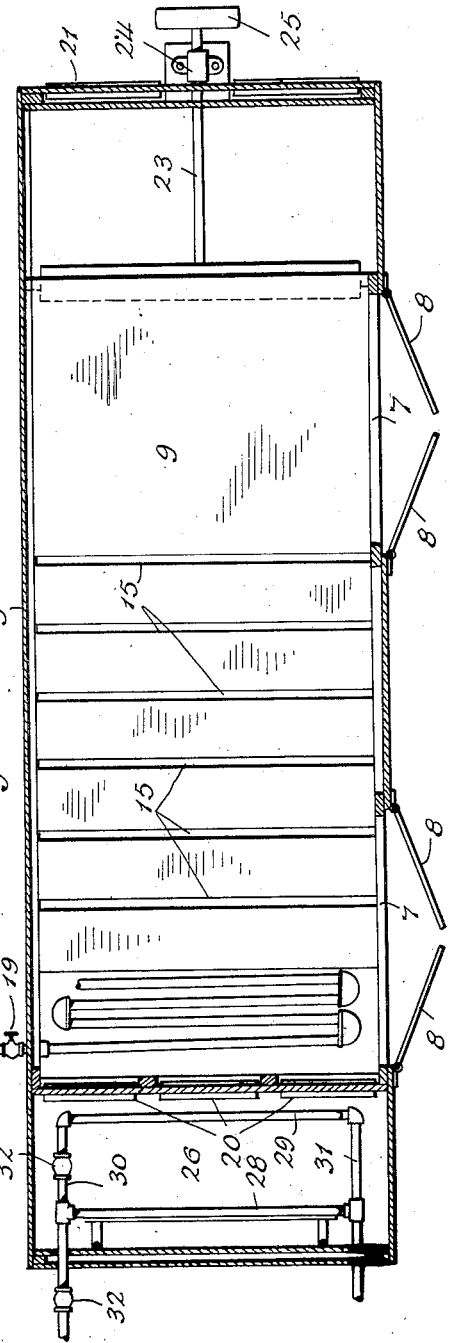
INVENTOR.
GUIDO E. BAROZZI
BY
ATTORNEYS.

Patented Apr. 14, 1936

2,037,559

UNITED STATES PATENT OFFICE 2,037,559

DRYING APPARATUS

Guido E. Barozzi, Woodcliff, N. J.

Application February 25, 1935, Serial No. 8,025

3 Claims. (Cl. 34—19)

The invention relates to apparatus for drying and treating materials of the class exemplified by furs, skins, pelts, hides, leather and alimentary pastes used in the manufacture of macaroni, spaghetti, vermicelli, etc., and has for its object to provide an apparatus of the type indicated which is simple in construction and of maximum efficiency, and which requires no particularly skilled supervision in its operation. Other more specific objects will appear from the description hereinafter and the features of novelty will be pointed out in the claims.

In the accompanying drawing, which illustrates an example of the invention without defining its limits, Fig. 1 is a sectional elevation of the novel drying apparatus, and Fig. 2 is a horizontal section thereof on the line 2—2 of Fig. 1.

In the illustrated example the apparatus is shown in a form specially adapted for drying alimentary pastes used in the manufacture of macaroni, spaghetti, vermicelli and the like, it being understood that this arrangement of the apparatus has been selected for illustrative and descriptive purposes only and without intent to define the limits of the invention as embodied in said apparatus.

In the form shown in the drawing the apparatus consists of a housing or casing 5 of predetermined dimensions and generally of elongated shape and constructed of any material suitable to the purpose for which the apparatus is designed. The housing or casing 5 contains a drying chamber 6 to which access may be had through openings 7 in the vertical front wall thereof, said openings being normally closed in any suitable manner as by double doors 8 provided with any conventional type of devices for maintaining said doors against unintentional opening. The top of the drying chamber 6 is formed by a horizontal partition 9 located in spaced parallel relation to the top of the housing or casing 5 to form a horizontal passage 10, said horizontal partition terminating at a distance from the opposite end walls 11 and 12 respectively to form openings 13 and 14 which establish permanently open communication between the drying chamber 6 and the opposite ends of the passage 10 respectively as illustrated in Fig. 1; the chamber 6 is further in permanently open connection with the passage 10 through slots 15 extending transversely across the partition 9 in spaced parallel relation to each other as shown in Figs. 1 and 2.

In the preferred arrangement, heating means illustrated in the form of a plurality of heating coils 16 is suitably supported in the passage 10 in proximity to the partition 9, said coils 16 being connected with each other by a pipe 17 and with a pipe 18 leading to a source of supply of steam or other heating agent; for purposes of control one or more valves may be provided as indicated for instance at 19 in Fig. 2. As shown in Fig. 1 the heating means exemplified by the coils 16 projects into registry with the opening 13 and terminates at a distance from the opening 14, this arrangement however being subject to change in order to meet the requirements of any particular type of apparatus. The end wall 11 of the casing or housing 5 is provided with a plurality of openings in each of which louvers 20 are located in any well known way, and the end wall 12 is formed with a single opening in which louvers 21 are mounted in any conventional manner. At one end of the drying chamber 6 air circulating means illustrated in the form of an exhaust fan 22 is provided, said fan 22 being operated in any customary manner as by being mounted upon a shaft 23 journalled in bearings 24 and projecting outwardly beyond the end wall 12 as shown in the drawing; the means for operating the shaft 23 is exemplified by the pulley and belt drive 25 located exteriorly of the casing 5 as illustrated in Fig. 1.

As shown in the drawing the housing or casing 5 is continued in the form of an ante-chamber 26 located beyond the end wall 11 and communicating directly with the drying chamber 6 through the louvers 20, said ante-chamber 26 having no direct connection with the passage 10 and being otherwise closed excepting at its upper end which communicates with the atmosphere at 27, as illustrated in Fig. 1. Heating means, for instance in the form of spaced coils 28 and 29, is suitably mounted in the ante-chamber 26, with the coil 29 preferably in proximity to the louvers 20; the coils 28 and 29 are connected with each other and with a source of steam or other heating agent by means of pipes 30 and 31, conventional valves 32 being provided at desired points to control the supply of heating agent to said coils 28 and 29.

In addition to the parts so far described, the apparatus includes means for deflecting the air entering the ante-chamber 26 through the open upper end 27. In the illustrated example this deflecting means is shown in the form of a deflecting member 33 extending downwardly in the ante-chamber 26 at an inclination from one side of the open upper end 27 of said ante-chamber 26 into proximity to the coils 28 and 29. The deflecting member 33 may be stationary at a fixed inclination or said member may be adjustable for instance by being pivotally secured in place at 34 in any conventional manner; in the latter case suitable means, exemplified by the handle 35, may be provided for selectively adjusting the position of said deflecting member 33, it being understood that in this case the arrangement is such that said deflecting member 33 will be fixed in any position to which it may be adjusted until again intentionally re-set to a different position.

In practice the material to be dried or treated in the apparatus may be carried upon suitable carriers 36 preferably mounted upon trucks 37 provided with rollers 38 or their equivalent to facilitate the introduction of the material into and its removal from the chamber 6 through the openings 7 when the doors 8 are open.

Assuming that the material, for instance a supply of alimentary paste in the form of macaroni, spaghetti, vermicelli or the like has been introduced into the chamber 6 upon the carriers 36 and that the doors 8 have been closed, the apparatus operates as follows:—

The exhaust fan 22 or its equivalent being rotatably operated, develops a suction action in the drying chamber 6 which draws fresh air from the atmosphere through the upper open end 27 into the ante-chamber 26, this air being deflected by the deflector 33 in a direction away from the drying chamber 6 and downwardly into contact with the heating coil 28 or its equivalent over which the air passes and becomes heated. The continued action of the fan 22 causes this air to subsequently pass over the heating coil 29 or its equivalent and through the openings between the louvers 20 directly into the drying chamber 6 and lengthwise thereof over the material located on the carriers 36. The action of the fan 22 also develops suction in the passage 10 so that a portion of the air current is passed upwardly through the opening 14 into said passage 10 at one end thereof as indicated by the arrows in Fig. 1, the air in said passage 10 travelling lengthwise thereof in a direction opposite of the direction of travel of the air in said chamber 6 and being returned directly to the chamber 6 through the opening 13 and the slots 15 in the horizontal partition 9; a portion of the air circulated by the fan 22 passes out of the apparatus through the spaces between the louvers 21 to the atmosphere. The air in its travel lengthwise of the passage 10 and through the openings 13 and slots 15 passes over and in contact with the heating coils 16 in said channel 10 and is thereby reheated prior to its return to the drying chamber 6.

With this arrangement a continuous circulation of air is maintained in the drying chamber 6 which supply of air is continuously augmented by heated fresh air from the ante-chamber 26, that portion of the circulated air which is returned to the chamber 6 by way of the passage 10, opening 13 and slots 15, as previously stated, being reheated by the coils 16 so that the current of air in the drying chamber 6 is maintained at the most effective drying temperature and therefore always exerts a maximum and efficient drying action on the material located on the carriers 36. When the drying operation has been completed the fan 22 or its equivalent is stopped and the doors 8 are opened to permit the ready removal of the carriers 36 with the dry material located thereon.

The apparatus is extremely efficient in operation and serves to adequately remove moisture from the material being treated without the necessity for any particularly skilled supervision. The deflection of the fresh air which enters the ante-chamber 26 through the opening 27 by means of the deflector 33 serves to divert this current of fresh air into direct and intimate contact with the heating coil 28, said current of air then being spread and passing over the second heating coil 29 before it enters the drying chamber 6. The reheating by the coils 16 of such air as is taken from the developed current of air and returned to the drying chamber 6 through the passage 10 and its communicating open end 13 and slots 15 serves to preserve the desired temperature of the air in the drying chamber 6 at all times.

The apparatus is particularly efficient for removing moisture from furs, skins, pelts, hides, leather and alimentary pastes used in the manufacture of macaroni, spaghetti, vermicelli, etc., and may also be effectively utilized for drying other materials.

Various changes in the specific forms shown and described may be made within the scope of the claims without departing from the spirit of the invention.

I claim:

1. In a drying apparatus, the combination of a drying chamber having its one end open directly to the atmosphere, an upright ante-chamber located exteriorly of said drying chamber at the opposite end thereof and communicating with said drying chamber at said opposite end, said ante-chamber being open directly to the atmosphere only at its upper end, a passage in direct permanently open communication at its opposite ends with said drying chamber and having no direct connection with said ante-chamber, means for drawing air from said ante-chamber into said drying chamber and for circulating said air through said drying chamber and said passage in relatively opposite directions independently of said ante-chamber, heating means in said ante-chamber for heating said air prior to its introduction into said drying chamber, means adjacent to the open end of said ante-chamber for deflecting the incoming air in a direction away from the drying chamber and downwardly toward the heating means in said ante-chamber, and additional heating means in said passage for reheating the circulated air prior to its return to said drying chamber.

2. In a drying apparatus, the combination of a drying chamber having its one end open directly to the atmosphere, an upright ante-chamber located exteriorly of said drying chamber at the opposite end thereof and communicating with said drying chamber at said opposite end, said ante-chamber being open directly to the atmosphere only at its upper end, a passage in direct permanently open communication at its opposite ends with said drying chamber and having no direct connection with said ante-chamber, means for drawing air from said ante-chamber into said drying chamber and for circulating said air through said drying chamber and said passage in relatively opposite directions independently of said ante-chamber, heating means in said ante-chamber for heating said air prior to its introduction into said drying chamber, and a deflector mounted adjacent to the open end of said ante-chamber for deflecting the incoming air in a direction away from the drying chamber and downwardly toward the heating means in said ante-chamber.

3. In a drying apparatus, the combination of a drying chamber having its one end open directly to the atmosphere, an upright ante-chamber located exteriorly of said drying chamber at the opposite end thereof and communicating with said drying chamber at said opposite end, said ante-chamber being open directly to the atmosphere only at its upper end, a passage in direct permanently open communication at its opposite ends with said drying chamber and having no direct connection with said ante-chamber, means for drawing air from said ante-chamber into said drying chamber and for circulating said air through said drying chamber and said passage in relatively opposite directions independently of said ante-chamber, heating means in said ante-chamber for heating said air prior to its introduction into said drying chamber, and a deflector adjustably mounted adjacent to the open end of said ante-chamber for selectively deflecting the incoming air away from the drying chamber and downwardly toward the heating means in said ante-chamber.

GUIDO E. BAROZZI.